United States Patent [19]

Braxton, Jr. et al.

[11] 3,891,448

[45] June 24, 1975

[54] MODIFIED PHOSPHAZENE FLAME RETARDANT

[75] Inventors: Henry G. Braxton, Jr., Franklin; U. Albert Lehikoinen, Detroit, both of Mich.

[73] Assignee: Ethyl Corporation, Richmond, Va.

[22] Filed: Mar. 5, 1973

[21] Appl. No.: 337,828

[52] U.S. Cl............. 106/15 FP; 252/8.1; 260/926; 260/927 N
[51] Int. Cl............................................. C09d 5/18
[58] Field of Search..... 106/15 FP; 260/926, 927 N; 252/8.1

[56] References Cited
UNITED STATES PATENTS

| | | | |
|---|---|---|---|
| 3,206,494 | 9/1965 | Lund et al. | 260/926 |
| 3,455,713 | 7/1969 | Godfrey | 252/8.1 |
| 3,505,087 | 4/1970 | Godfrey | 252/8.1 |

*Primary Examiner*—Harry Wong, Jr.
*Attorney, Agent, or Firm*—Donald L. Johnson; Robert A. Linn

[57] ABSTRACT

Flame retardants are prepared by reacting partially and fully or substantially fully hydrocarboxylated phosphazenes. They may be used as flame retardants for cellulose fibers, filaments, filamentary articles and films. For rayon or other regenerated cellulose the materials may be incorporated into the cellulose by adding to viscose and shaping, coagulating and regenerating a filament.

10 Claims, No Drawings

MODIFIED PHOSPHAZENE FLAME RETARDANT

BACKGROUND OF THE INVENTION

Various materials made from phosphonitrilic chlorides are useful as fire retardants; U.S. Pat Nos. 3,455,713, 3,505,087, and 3,532,526.

So far as is known, materials made by the process of this invention have not been heretofore described.

Polydichlorophosphazene linked by a P—O—P bond is depicted on

Page 138 of H. R. Allcock, *Phosphorus-Nitrogen Compounds*, Academic Press, New York, New York (1972), and Page 317 of J. R. Van Wazer, *Phosphorus and Its Compounds*, 1 Interscience Publishers Inc, New York, New York (1958)

Polymers having P—O—P bonds made by a different process are described on pages 97–8 of *Chemical Week*, Feb. 20, 1965.

SUMMARY OF THE INVENTION

This invention encompasses four major aspects: modified phosphazene polymers, their production, cellulose fibers containing them and a method of preparing the fibers.

Thus, one embodiment comprises a process for the preparation of a modified phosphazene fire retardant, said process comprising reacting a substantially fully hydrocarbyloxylated phosphazene and a partially hydrocarbyloxylated phosphazene such that organic chloride is formed, a. said substantially fully hydrocarbyloxylated phosphazene having the formula $$\left[ \begin{array}{c} OR \\ | \\ P = N \\ | \\ OR \end{array} \right]_n$$

wherein $n$ is at least 3 and R is a hydrocarbyl radical of up to about 7 carbons, b. said partially hydrocarbyloxylated phosphazene having the formula $$\left[ \begin{array}{c} T \\ | \\ P = N \\ | \\ T \end{array} \right]_N$$

wherein $N$ is at least 3, and T is selected from the class consisting of chlorine, bromine and —OR wherein R has the same significance as above, such that from about 80 to about 95 weight per cent of said T groups are OR and the remainder is halogen.

A second embodiment comprises the product produced by this process.

A third embodiment comprises regenerated cellulose filaments and fibers containing a flame retardant amount of such product.

Another embodiment comprises a method for preparing a cellulose filament which comprises mixing a flame retardant product of this invention with viscose and shaping, coagulating and regenerating said filament from said viscose-containing mixture.

DESCRIPTION OF PREFERRED EMBODIMENTS

Starting materials for a process of this invention are organophosphazenes of two types, of which the first is a fully or substantially fully substituted phosphazene represented by the formula $$\left[ \begin{array}{c} OR \\ | \\ P = N \\ | \\ OR \end{array} \right]_n$$

where $n$ is at least three and R is an organic, preferably a hydrocarbyl group or halogen substituted hydrocarbyl group. Preferably R is of up to about seven carbon atoms. R can be alkyl, cycloalkyl, alkenyl, alkaryl, aralkyl, or aryl. Examples of such groups designated by R are methyl, ethyl, n-propyl, isopropyl, n-butyl, cyclohexyl, cyclopentyl, 1-propenyl, 1-pentenyl, 2,3-xylyl, phenyl, naphthyl, benzyl, and the like. The radicals may have one or more halogens such as the radicals chloropropyl, chloroethyl, chlorophenyl, 2,3-dichloropropyl, 1,3-dichloropropyl, and the brominated and fluorinated derivatives thereof.

The second type of organophosphazene used in this process is represented by the formula $$\left[ \begin{array}{c} T \\ | \\ P = N \\ | \\ T \end{array} \right]_n$$

wherein $n$ is at least 3 and T is selected from chlorine, bromine and OR wherein R has the same significance as above, such that from about 80 to about 95 weight per cent of the T groups are —OR and the remainder is halogen.

Both types of phosphazenes can be prepared by reacting the corresponding alcohols and phenols or metal derivatives thereof with a phosphonitrilic halide. When the alcohols and phenols are used, they preferably are reacted in the presence of an organic base such as pyridine; U.S. Pat. Nos. 2,192,921, 2,586,312, *J. Am. Chem. Soc.* 71, 2251 (1949) and Netherlands Pat. No. 71/06,772.

More preferably, the organophosphazenes are prepared by reacting the alcohols and phenols in the form of metal alcoholates and phenolates, M—OR wherein R is an organic radical, and M an alkali metal such as sodium or potassium.

It is not necessary to use pure alcohols, phenols, phenolates, or alcoholates, mixtures can be used as sodium butoxide-sodium ethoxide-sodium propoxide or sodium phenolate-sodium propoxide, for example. Three, four or more materials can be used in the mixtures and the relative concentration of each ingredient can be varied as desired.

The phosphonitrilic halides used to prepare the phosphazenes have the formula $(PNX_2)_n$ where n is at least 3 and X is preferably chlorine or bromine. Usually, the phosphonitrilic halides used are mixtures but pure materials can be used, if desired. The halides can be cyclic trimer, tetramer or higher cyclic polymer, linear polymer, or mixture thereof. The molecular weight can be where $n=3$ to 500, 1500, 3000, 5000, 10,000 or more, preferably from about 350 to about 5000.

The phosphonitrilic chlorides can be obtained by reacting ammonia or ammonium chloride with phosphorus pentachloride:

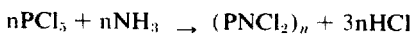

$$nPCl_5 + nNH_4Cl \rightarrow (PNCl_2)_n + 4nHCl$$

$$nPCl_5 + nNH_3 \rightarrow (PNCl_2)_n + 3nHCl$$

Methods for conducting these processes have been described in U.S. Pat. Nos. 3,367,750 and 3,656,916, for example. These patents are incorporated by reference herein as if fully set forth.

Phosphonitrilic chlorides can also be obtained by:
reacting ammonia with phosphorus and chlorine, U.S. Pat. No. 3,658,487, and
reacting phosphorus trichloride, chlorine, and ammonium chloride; U.S. Pat. No. 3,359,080.

These patents, as well as *Am. Chem. J.* 19 782 (1897), Ber. 57 B, 1343 (;924) U.S. Pat. Nos. 2,788,286, 3,008,799, 3,249,397, 3,347,643, 3,372,005, 3,378,353, 3,379,511, 3,407,047, 3,462,247, Netherlands Pat. No. 70,05128, and *J. Chem. Soc* (A) pp. 768–772 are incorporated by reference herein as if fully set forth.

A preferred method for preparing phosphonitrilic halides for use in this invention may be described as follows: Phosphorus pentachloride slurried in monochlorobenzene is charged to a reactor. The reactor is sealed and gaseous HCl introduced with agitation to assist solution of the HCl in monochlorobenzene. The reactor is pressurized with from about 10 to about 40 psig with gaseous HCl. Ammonia is then introduced at a rate not less than 0.13 liters per minute per mole of $PCl_5$ and heat is applied to raise the temperature of the reaction mixture to 110° to 150°C. during this initial ammonia feed. The hydrogen chloride pressure will fall at first, and additional hydrogen chloride can be added to maintain the desired pressure. However, this is not essential if the initial pressure is at least 10 psig at the start of ammonia feed since by-product hydrogen chloride will be produced before all of the preadded hydrogen chloride is used up. The reaction between ammonium chloride and $PCl_5$ initiates at about 60°C. The temperature rises to about 110–140°C. The feed rate of ammonia is reduced after about ½ hour and held to a rate of from about 0.05 to about 0.13 liters per minute per mole of $PCl_5$. This rate is continued for about three hours, or depending upon the amount fed until at least the stoichiometric amount of ammonia is added. After the ammonia has been fed into the reaction, the temperature is maintained for about 1 hour at between 110°–150°C., preferably from 120° to 130°C. under pressure from 10–40 psig and preferably about 20 psig. This heating period finishes the reaction by allowing traces of unreacted material to react. After about 1 hour the pressure is released and heating is continued for another ½ hour at reaction temperature. This allows any remaining hydrogen chloride dissolved in the solvent to be removed.

The product of this reaction is generally 65–75 per cent cyclic phosphonitrile chloride polymers and 35–25 per cent linear materials. In general, the cyclic distribution ranges from 60–75 per cent trimer, 18–24 per cent tetramer, and 7–12 per cent of pentamer. The product yield ranges upward of 90 per cent, based on the amount of phosphorus used. Yields higher than 92 per cent are not uncommon. In contrast, products of prior art processes have cylic products ranging from 80–85 per cent cyclic using lower feed rates followed by higher feed rates of ammonia. Moreover, the traditional process for producing phosphonitrile chloride using a solid ammonium chloride of commerical grade and a halogenated aliphatic hydrocarbon solvent produces a generally higher molecular weight product consisting of about 50 per cent cyclics and about 50 per cent linears.

EXAMPLE I

To a glass reactor equipped with stirrer, a reflux condenser and a means for heating the reactor contents was charged 208.3 grams (1.0 mole) of phosphorus pentachloride in 312.5 grams of monochlorobenzene. The reactor was sealed and anhydrous hydrogen chloride was fed into the reactor with stirring until the pressure of the reactor was about 15 psig. A total of 7.6 grams (0.208 mole) of hydrogen chloride was added to the reactor. Gaseous ammonia was then introduced to the reactor at a rate of 0.182 liters per minute per mole of phosphorus pentachloride while the reactor contents were heated at a rate of 2.5°C. per minute using a heating mantle on the reactor. The ammonia feed rate was dropped to 0.0908 liters per minute per mole of phosphorus pentachloride after about 5.46 liters (0.241 mole) of ammonia was fed into the reactor over a period of about 30 minutes. The temperature was controlled at 130°C. and pressure at 20.0 psig. The ammonia feed was stopped when a total of 22 liters (1.0 mole) was fed into the reactor. The heating and stirring was continued for one hour at 20 psig. and for another 30 minutes at atmospheric pressure. The total reaction time was 5½ hours. The reactor contents were then cooled to room temperature and discharged from the reactor by nitrogen pressure. About 400 grams of clear product solution was obtained. Analysis by vapor phase chromatograph showed that the solution contained 26.6 per cent phosphonitrilic chlorides of which 63.3 per cent were cyclic compounds with the following distribution: trimer-73 per cent, tetramer-20 per cent, and pentamer-7 per cent. The recovered yield was 92 per cent, based on phosphorus pentachloride.

EXAMPLE II

The procedure of Example I was repeated, except that a total of 22.8 liters (1.047 mole) of ammonia was fed to the reactor and the initial heating rate was 1.5°C. per minute. The reaction was initiated at 65°C. as observed by a sudden change in the rate of temperature increase. The reaction mixture was heated to 130°C. over two hours period and held at that temperature for three hours. The product slurry, about 392.5 grams, was obtained after 5½ hours reaction time. Vapor phase chromatograph analysis of the product showed 67.7 per cent cyclic phosphonitrilic chloride polymers having the following distribution: trimer-64 per cent, tetramer-24 per cent, pentamer-12 per cent. The recovered yield of total product was 92 per cent, based on phosphorus pentachloride.

The procedure of Example I was repeated with different reaction times and temperatures. Ammonia was fed at the same rate with 10 per cent excess (1.1 mole total) (Examples III and IV) to 2 per cent short (0.98 mole total) (Example V). The results of these experiments are shown in the following table.

TABLE I

PREPARATION OF PHOSPHONITRILE CHLORIDE

| Ex. | Reaction Temp. °C. | Reaction Time hrs. | Percent Product Distribution | | | Percent Cyclics | Percent Yield |
|---|---|---|---|---|---|---|---|
| | | | Trimer | Tetramer | Pentamer | | |
| III | 120 | 7½ | 65 | 20 | 15 | 75 | 85 |
| IV | 140 | 4½ | 73 | 18 | 9 | 77 | 74 |
| V | 150 | 4 | 90 | 8 | 2 | 50 | 80 |

The reaction between phosphonitrilic halide and hydroxy compound, or metal derivative thereof is preferably conducted in the presence of a liquid to facilitate contacting the reactants. Preferred reaction media are exemplified by hexane, heptane, ligroin, benzene, toluene, the xylenes, monochlorobenzene, and propanol.

As indicated above, the phosphazenes are preferably prepared by reacting phosphonitrilic halide with alkali metal alcoholate or phenolate. It is preferred, when preparing the fully or substantially fully substituted phosphazene, that the alkali metal derivative be in substantial excess over the theoretical requirement. By a substantial excess is meant an excess of at least about 5 weight per cent. It is convenient to use amounts of alkoxide or aryloxide which are from about 5 to about 15 weight per cent excess over the theoretical requirement.

In many instances, the reaction is rapid and exothermic at the beginning and requires no heating. After mixture of the reactants is complete it may be convenient to heat the resultant reaction mass and hold it at reflux temperature for such time as analysis indicates complete reaction. Reaction times in the range of from ½ to 10 hours can be used. This is somewhat dependent upon the reaction temperature which is usually within the range of from ambient to 110°C.; more preferably from about 55° to about 110°C.

After conduction of the reaction, the excess free hydroxy compound and the solvent are removed by distillation or other suitable means. These can be recycled for later use.

As with the preparation of the metal derivative of the hydroxy compound the phosphazene synthesis proceeds well at ambient pressure. Accordingly, atmospheric pressure is of choice. However, greater or lesser pressures can be used if desired.

When preparing mixed phosphazenes, the phosphonitrilic halide is reacted with a mixture of metal derivatives of two or more hydroxy compounds. Thus, for example, one can prepare mixed propoxyphosphazenes by reacting the sodium derivative of a mixture of normal- and isopropyl alcohols. In a similar fashion, mixed ethoxy-butoxy phosphazenes and mixed butoxyphosphazenes can also be prepared. In like manner, the phosphazenes may be derived from two or more phenols or can be prepared from mixtures of phenols and alcohols. A typical example of the latter type is the product obtained by reacting phosphonitrilic chloride with a 1:1 mixture of sodium methoxide and sodium phenoxide.

It is to be understood that mercaptides can be used in a fashion similar to that described above to prepare the sulfur compounds analogous to the above-described phosphazenes.

After removal of the free hydroxy compound and solvent, it is convenient to isolate the product from the resultant mass by water-washing followed by stripping the remainder of the solvent. In many instances, best results are obtained by using a plurality of water washes. It many instances, two washes will suffice. For precaution against emulsions during washing, it is preferred to have the water washes conducted such that the water has a pH of 9 or higher. Water-washing is employed by mixing the phosphazene product with water and agitating. Typical agitating times are 10 to 20 minutes but shorter or longer times can be employed, if desired. If in the first water wash, a rag layer appears, it can be left with the organic layer for a subsequent wash. If emulsion appears in the second wash, sodium chloride or other salt can be added to increase the density difference between the phases.

After water-washing and separating, the organic layer can be subjected to distillation to remove solvent. Distillation can be conveniently conducted at reduced pressure, say, 20–30 mm Hg. All or substantially all solvent can be removed in this manner; alternatively, the bulk of residual solvent can be removed by other means such as a Rodney Hunt wiped film evaporator.

The following typical procedure is illustrative but non-limiting.

EXAMPLE VI

A. Take a 4000 gallon, glass-lined reactor equipped with heating, cooling, stirring, and condensing means as well as a vent routed through a water scrubber to remove by-product HCl. Clean and dry the vessel and purge it with nitrogen. Charge 17,150 pounds of monochlorobenzene and activate the stirring means. Add 10,268 pounds of $PCl_3$ and activate cooling means.

Feed chlorine into the vapor phase in the reactor such that a total of 5210 pounds is admitted. Keep the addition rate such that the reactor temperature is at a 25°C. maximum and the reactor pressure is below 5 psig. The addition of chlorine will take about 4–6 hours. The $PCl_5$ produced is utilized in the following way.

B. Break the vacuum with nitrogen and add 5210 pounds of $NH_4Cl$ below 80 microns in size. Seal the reactor and heat to reflux (~130°C) for 8 hours. Vent the HCl gas evolved to the water scrubber.

Thereafter (the reaction is more than about 50 per cent complete) slowly distill monochlorobenzene until 10,500 pounds have been removed. The reactor is maintained at 125°–135°C. until reaction is complete as determined by virtual cessation of HCl evolution and by demonstrating the equal volumes of reaction mass and cyclohexane (or undecane) yield only one liquid phase.

Procedures (A) and (B) are repeated and the two batches are combined. Centrifugation is conducted (using a centrifuge capable of 800 G operation) to remove excess $NH_4Cl$. The $NH_4Cl$ can be recycled.

The filtrate is stripped to remove 13,400 pounds of monochlorobenzene which is held for recycle. Then, 15,355 pounds of toluene are added to the product. The yield is 16,200 pounds of neat phosphonitrilic chloride from each two-batch lot.

C. Melt 495 pounds of sodium at 110°C. Heat 1580 pounds of toluene to the same temperature. Add the molten sodium to the hot toluene in a suitable vessel. To the hot mixture add 1480 pounds of propanol. By metering the $H_2$ evolution, add the propanol at such a rate that no more than about 150 pounds of unreacted propanol is present. Maintain the reaction mixture hot enough to avoid sodium solidification. Two to four hours is required for the propanol addition.

The reaction is maintained at reflux until hydrogen evolution has substantially ceased (and the sodium reacted to substantial completion). About 1–3 hours will be required after the completion of the propanol addition. The sodium propylate produced is utilized as below.

D. The toluene phosphonitrilic chloride mixture (2270 pounds) is added to the sodium propylate. The sodium propylate is a 10 per cent excess over the theoretical requirement based on recovered $PNCl_2$. Initially, the reaction is rapid and exothermic and requires no heating. After all of the $PNCl_2$ has been added the mixture is heated to reflux (~107°C) and held for 3–6 hours until the reaction is shown to be complete by VPC analysis.

Fifty gallons of propanol and toluene are removed from the reaction mixture by distillation. This is recycled back to the next batch of sodium propylate. The quantity of fresh propanol feed is adjusted for the composition of the recycle stream. The product is cooled to 60°C.

E. The first water wash consists of 375 gallons of water. The agitator is turned on for fifteen minutes, then shut off and the mixture is allowed to settle for 30 minutes. The water layer is withdrawn. Any ray layer is left with the organic layer for the second wash or can be discarded, as desired. The second wash consists of 100 gallons of water. The contents are agitated for 15 minutes. The mixture is allowed to separate and the water layer is withdrawn. If an emulsion forms at this point, sodium chloride is added to increase the density different between the phases.

At this point, 2715 pounds of solvent and a small quantity of n-propanol is stripped from the hexapropoxyphosphazene (HPP) at 20–30 mm Hg and <80°C. A forecut of 250 pounds is taken to remove residual water. The distillate is collected and the forecut is discarded. About 10 per cent solvent remains in the HPP following this stripping operation. The product is fed to a Rodney-Hunt wiped-film evaporator where the remainder of the solvent is stripped from the HPP at 5–10 mm Hg, 100°C. (the final product contains <1.0 per cent solvents). The HPP is stored in 350 gallon portable containers from which it is filtered and packaged for shipping. The solvent is transferred to the distillation columns where the MCB and toluene are separated for recycle.

EXAMPLE VII

A. To a clean, dry, nitrogen-flushed 10 gallon glass-lined reaction vessel, charge 41.5 pounds of dry monochlorobenzene (MCB) and 25.68 pounds of $PCl_3$. Pressure the vessel to 10 psig with nitrogen, then evacuate to 200 mm and shut off the vacuum system from the vessel. Chorine (13.4 pounds) (1 per cent excess) gas is added above the surface of the stirred liquid. This reaction is exothermic and it is necessary to cool the reaction to hold the temperature below 25°C. However, do not cool below 5°C. as $PCl_3$ will crystallize out and the chlorination will not be complete. White solid $PCl_5$ separates from the MCB solution. Near the end of the reaction, permit a positive pressure of 10 pounds of chlorine on the reactor. When the theoretical weight of chlorine has been added, remove a sample of the liquid layer and analyze for $PCl_3$.

B. Add dry ammonium chloride (11.0 pounds or 10 per cent excess) to the $PCl_5$ slurry in the 10 gallon glass-lined vessel. Seal the vessel, mix and introduce nitrogen over the surface of mixture to assist in HCl removal. Slowly heat to 125°C. removing all materials distilling up to 105°C. with $N_2$ in the head space. The rate of heating is determined by the rate of HCl evolved. Attach the top of the condenser to a HCl scrubber and measure the HCl evolved by weighing the HCl scrubber. Reaction will start between 95°–115°C. depending on $NH_4Cl$ particle size. When about 10–15 per cent of the HCl gas has been evolved, start the addition of ammonia gas to the reactor at such a rate as to maintain an excess of HCl gas being evolved from the reactor. Add a total of 3.5 pounds of $NH_3$ gas (10 per cent excess). Use a capillary dipleg, maintain a $N_2$ stream through the dipleg until the $NH_3$ feed has begun. At the completion of the $NH_3$ feed, resume nitrogen feed—at all times have a gas stream through the dipleg. Sample during the last part of the HCl evolution for analysis. Test material for complete cyclization after HCl evolution is complete by mixing an equal volume of the $PNCl_2$ solution, as is, with an equal volume of cyclohexane. If one phase remains, then the reaction is ready for the next step.

Filter the mixture to remove the excess $NH_4Cl$, wash the filter with MCB, and then dry and use this $NH_4Cl$ in the next run. Strip off the MCB at 50°–55°C. (20 mm Hg absolute) until a thick stirrable slurry remains. Add the minimum amount of toluene to the mixture to effect complete solution.

The partially substituted phosphazene is prepared in the same way except that some of the halogen atoms in the phosphonitrilic halide are left unsubstituted. In other words, less than all the halogen atoms are displaced. In general, when preparing the partially substituted phosphazene, one uses from about 10 to about 97 weight per cent of the stoichiometric amount of the hydroxy compound or metal derivative thereof. Greater or lesser amounts can be used. More preferably, from about 60 to about 95 weight per cent of the stoichiometric amount is used. In a highly preferred embodiment, about 80–95 weight per cent of the stoichiometric amount is employed.

The phosphazenes can have a number average molecular weight of where $n=3$ up to 1000, 3000, 5000, 10,000 or more. Preferably, materials having a molecular weight of from about 400 to about 10,000 are used. More preferably, they have a molecular weight of 400–8000.

The fully substituted phosphazenes may contain residual halogen from incomplete substitution of alkoxy or aryloxy groups. Thus, the phosphazene can have up to 2 weight per cent chlorine and, as designated herein, be substantially fully substituted.

When the reaction is conducted, equal weights of partially and substantially fully substituted phosphazenes can be employed, but is not necessary to do so. A weight excess of either reactant can be employed. An amount of chlorine sufficient to give the desired amount of crosslinking is employed.

Crosslinking is achieved by reaction of the halogen atom with alkoxy or aryloxy groups, for example, to form an alkyl halide or aryl halide. Although not bound by any theory, it is believed the product of this reaction can be illustrated by the following:

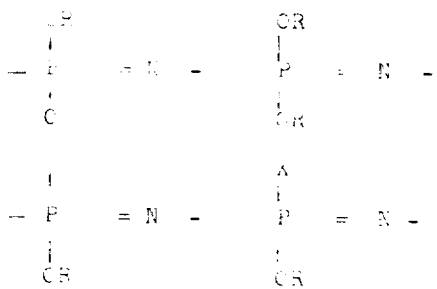

The P—O—P bond illustrated was formed by splitting out R—Cl.

There are two ways to achieve the amount of halogen desired in the reaction mixture:
a. Use a relatively large amount of a partially substituted phosphazene with a relatively small amount of halogen, and
b. Use a relatively small amount of a partially substituted phosphazene having a relatively large amount of halogen.

Of course, any combination of these two methods can be used such as an intermediate amount of a partially substituted phosphazene having an intermediate amount of halogen. Also, any combination of two or more halogen-containing phosphazenes can be employed and one can use any residual halogens on the substantially fully substituted phosphazene.

Using any of these means alone or in combination, it is usually desirable that the reaction mixture contain from 1–30 weight percent chlorine, preferably 1–17 and more preferably 2–8 weight per cent.

In general, mildly elevated temperatures are employed. In general, reaction temperatures are usually higher than that required to react alcoholate, phenolate, alcohol, or phenol with phosphonitrilic chloride. Good results are achieved if the temperature is within the range of from about 80° to about 220°C.; somewhat higher and lower temperatures can be used. A preferred temperature range is from about 90° to about 190°C.

The heating time is not critical. The temperature is somewhat dependent on the inherent ability of the starting materials to react and the time is also dependent on the degree of reaction desired. In general, longer heating times, as higher heating temperatures cause greater amount of crosslinking or viscosity increase. Thus, with a minor amount of routine experimentation a skilled practitioner can determine the reaction temperature and time required to give the desired amount of reaction or viscosity increase. In general, heating times of ½–120 minutes afford good results; from about 3 to about 60 minutes are preferred. However, times as long as three hours or more can be used.

The reaction can be conducted in the presence of an inert liquid reaction medium such as toluene or other hydrocarbon, but it is not necessary to do so. Similarly, the reaction can be conducted in the presence of an inert atmosphere such as nitrogen or argon, but it is unnecessary to do so.

The reaction can be conducted at ambient pressure. However, superatmospheric and subatmospheric temperatures can be used if desired. Subatmospheric pressures during the course or after the reaction can assist removal of volatile components evolved. Preferred subatmospheric pressures are 0.1 to 180 mm Hg.

EXAMPLE VIII

A reaction was conducted between a partially propoxylated phosphazene (A) and a substantially fully propoxylated phosphazene (B). The materials had the following characteristics:

|  | (A) | (B) |
|---|---|---|
| Percent phosphorus | 20.9 wt % | 19.6 % |
| Percent chlorine | 4.04 | 1.0 |
| Viscosity 68°F. | 235.1 | 365 |
| Number average molecular weight | 803 | 799 |

In the reaction a 1 kilogram sample of each starting material was heated for one hour at a temperature between 115° and 183°C. The reaction was conducted under a pressure of 100–110 mm of Hg. During the reaction, 100 per cent by weight of the theoretical amount of propyl chloride was evolved.

The reaction was repeated using 1.5 kilogram portions of reactants (A) and (B). The reaction was conducted for 1.5 hours at a temperature of 118°–184°C. The same pressure as above was employed. Likewise, 100 per cent of the theoretical amount of propyl chloride was evolved.

The reaction was repeated again using 1.5 kg. samples of each reactant. This time, heating was conducted over a period of 120 minutes at a temperature between 116°–182°C. of the theoretical amount of propyl chloride, 94 weight per cent was evolved. The reaction was conducted at the same pressure as above.

The product of the three reactions was combined and the combined product had the following characteristics:

| Wt. percent phosphorus | 20.7 |
|---|---|
| Wt. percent nitrogen | 9.14 |
| Wt. percent chlorine | 0.57 |
| Viscosity at 20°C. | 1090 centistokes |
| Number average molecular weight | 890 |

EXAMPLE IX

A reaction was conducted between a partially propoxylated phosphazene and another sample of the fully substituted phosphazene (B) used in the previous example. The partially substituted phosphazene had the following characteristics:

| | |
|---|---|
| Wt. percent phosphorus | 21.7 |
| Wt. percent chlorine | 5.18 |
| Viscosity at 20°C. | 1021 centistokes |
| Number average molecular weight | 884 |

A 1.5 kg. portion of each reactant was heated together for 1.25 hours at a temperature of 114°–162°C. During that time the pressure was maintained at 105–110 mm of Hg. Of the theoretical amount of propyl chloride, 82 weight per cent was evolved.

The reaction was repeated using 1.5 kg. samples of both reactants. The combined mixture was heated for 1.25 hours at 121°–170°C. The reaction pressure was 100–105 mm of Hg. Propyl chloride, 98 weight per cent of theory, was evolved during the reaction.

Each product was combined and the composite product had the following characteristics:

| | |
|---|---|
| Wt. percent phosphorus | 21.6 |
| Wt. percent nitrogen | 9.47 |
| Wt. percent chlorine | 0.67 |
| Number average molecular weight (in benzene) | 1030 |
| Viscosity 20°C. | 4697 centistokes |

EXAMPLE X

The above Examples VIII–IX were substantially repeated using a different batch of substantially fully propoxylated phosphazene. Unlike the material (B) of Examples VIII–IX which was made from phosphonitrilic chloride derived from ammonium chloride and $PCl_5$, the substantially fully propoxylated starting material of this example was made from phosphonitrilic chloride made from ammonia and $PCl_5$. The product, after reaction with partially propoxylated phosphazene had the following characteristics:

| | |
|---|---|
| Phosphorus wt. percent | 21.5 |
| Chlorine wt. percent | 3.0 |
| Nitrogen wt. percent | 9.45 |
| Number average molecular weight (in benzene) | 1030 |
| Viscosity at 20° | 6662 centistokes |

Similar results are obtained when the substantially fully propoxylated and the partially propoxylated reactants are made from
 phosphonitrilic chloride produced by the processes of Examples I–IV, and
 phosphonitrilic chloride produced by the processes of Examples V–VI, herein.

Similar results are obtained when the substantially fully and partially propoxylated phosphazene reactants have molecular weights of from where $n=3$ to 4000 and the partially propoxylated phosphazene has a chlorine content equivalent to 80–95 weight per cent of said T groups are propoxy, and the remainder are chlorine.

Similar results are obtained when the fully and partially substituted phosphazenes have instead of propoxy groups
 a. ethoxy groups
 b. n-butoxy groups
 c. ethoxy and n-butoxy groups (50–50 mixture by weight)
 d. phenoxy groups
 e. n-heptoxy groups
and the reaction is conducted at temperatures of from 90°–190°C. and the total weight per cent chlorine in the substantially fully and partially substituted phosphazene is from 1–17 weight per cent.

Materials prepared by the process described and exemplified above can be used as flame retardant agents for cellulose materials including fibers, filaments, fabrics and films. The materials can be added by dipping, spraying, or other means utilized for treating the surface.

Alternatively, for rayon and other regenerated cellulosics, the fire retardant may be impregnated or added to the product by incorporation in the viscose prior to spinning. The amount of fire retardant can be from about 1 to about 30 weight per cent and preferably from about two to about 20 weight per cent.

For impregnation prior to spinning and the finished materials, one may refer to Godfrey U.S. Pat. No. 3,455,713. That patent is incorporated by reference herein as if fully set forth. Thus, one method of cellulose filaments and filamentary articles according to this invention is to use the flame retardants provided herein according to the method of Godfrey supra. Likewise, the instant invention provides regenerated cellulose fibers, filaments, filamentary articles and fabrics prepared from the flame retardants herein provided utilizing the techniques set forth by Godfrey.

Preferred modified phosphazene fire retardant products of this invention have a number average molecular weight of from about 900 to about 15,000.

We claim:

1. Process for the preparation of a modified phosphazene fire retardant, said process comprising reacting a substantially fully hydrocarbyloxylated phosphazene and a partially hydrocarbyloxylated phosphazene; said phosphazene reactants being composed of at least about 65% cyclics and having a number average molecular weight of from about 400 to about 10,000 a. said substantially fully hydrocarbyloxylated phosphazene having the formula

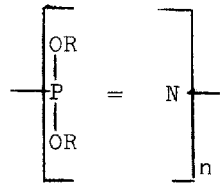

wherein $n$ is at least 3, such that the number average molecular weight is as stated above and each R is a hydrocarbyl radical of up to about seven carbon atoms and is selected from the class consisting of alkyl, cycloalkyl, alkenyl, alkaryl, aralkyl, and aryl, b. said partially hydrocarbyloxylated phosphazene having the formula

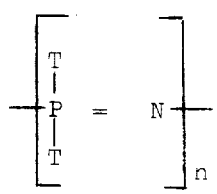

wherein each T is selected from the class consisting of chlorine, bromine, and —OR such that from about 80 to about 95 per cent of said T groups are —OR and the remainder is halogen, and wherein $n$ and R have the same significance as above; said process being conducted by heating said phosphazenes at from about 90° to about 190°C. such that said modified phosphazene fire retardant is formed by splitting out RX by-product wherein R and X have the same significance as above.

2. A process of claim 1 wherein each R is propyl.

3. A process of claim 1 wherein said halogen is chlorine.

4. A product of a process of claim 1.

5. Regenerated cellulose filaments and filamentary articles having dispersed therein a flame retardant amount of a product of a process of claim 1.

6. Regenerated cellulose filaments and filamentary articles of claim 5 wherein each R is propyl.

7. Regenerated cellulose filaments and filamentary articles of claim 5 wherein said halogen is chlorine.

8. A method of preparing a flame-retardant regenerated cellulose filament which comprises mixing viscose and a flame retardant product produced by a process of claim 1, shaping the mixture into a filament, and coagulating and regenerating said filament.

9. A method of claim 8 wherein R is propyl.

10. A method of claim 8 wherein said halogen is chlorine.

* * * * *

UNITED STATES PATENT OFFICE
CERTIFICATE OF CORRECTION

PATENT NO. : 3,891,448
DATED : June 24, 1975
INVENTOR(S) : H. G. Braxton et al

It is certified that error appears in the above-identified patent and that said Letters Patent are hereby corrected as shown below:

Column 8, line 46, after "way" the term -- as the fully substituted phospharene -- should be inserted Column 13, lines 9-10, of Claim 1, should read "by splitting out hydrocarbyl halide by-product."

Column 14, add Claim 11, which reads

"A product of a process of Claim 2."

On the cover sheet "10 Claims" should read -- 11 Claims --.

Signed and Sealed this sixteenth Day of September 1975

[SEAL]

Attest:

RUTH C. MASON
Attesting Officer

C. MARSHALL DANN
Commissioner of Patents and Trademarks